C. H. SHEPARD.
TYPE WRITING MACHINE.
APPLICATION FILED AUG. 1, 1910.
974,441.
Patented Nov. 1, 1910.
3 SHEETS—SHEET 1.
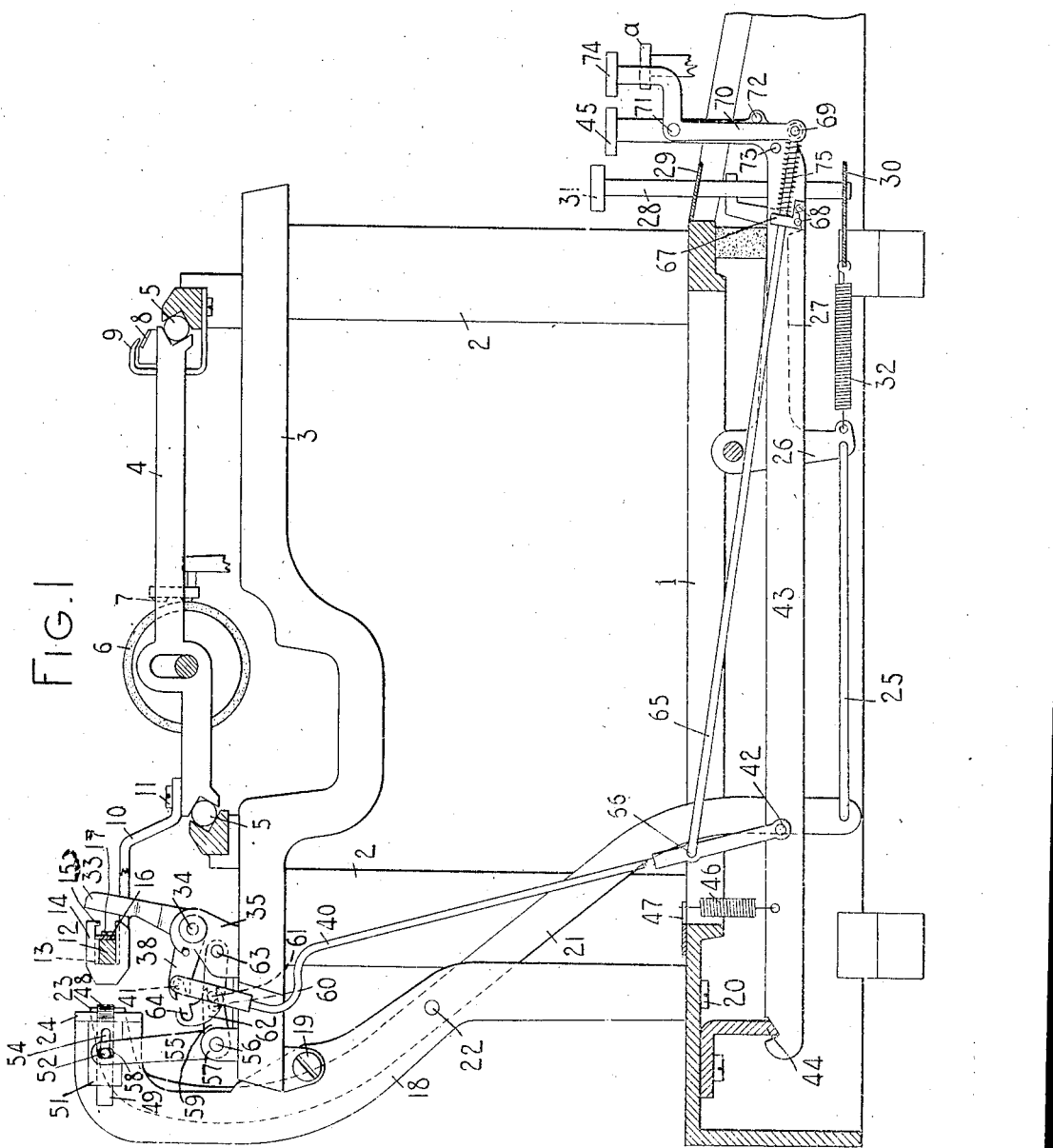
WITNESSES:
INVENTOR.
Charles H. Shepard
By Jacob Felbel
HIS ATTORNEY

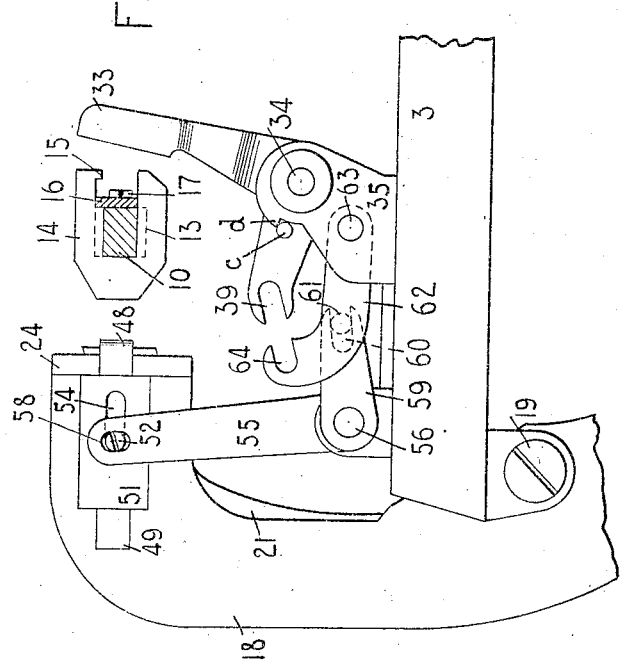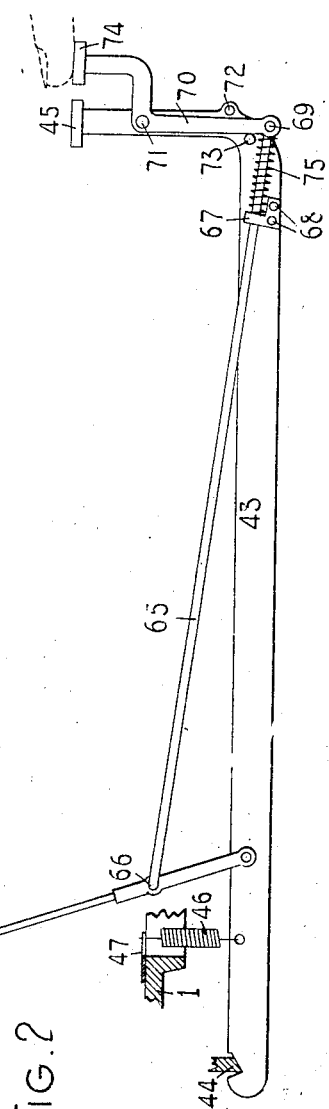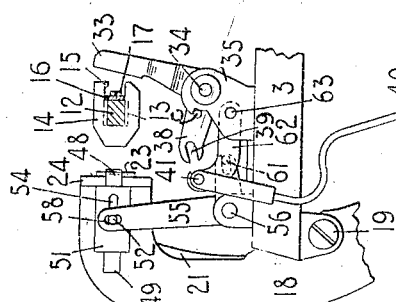

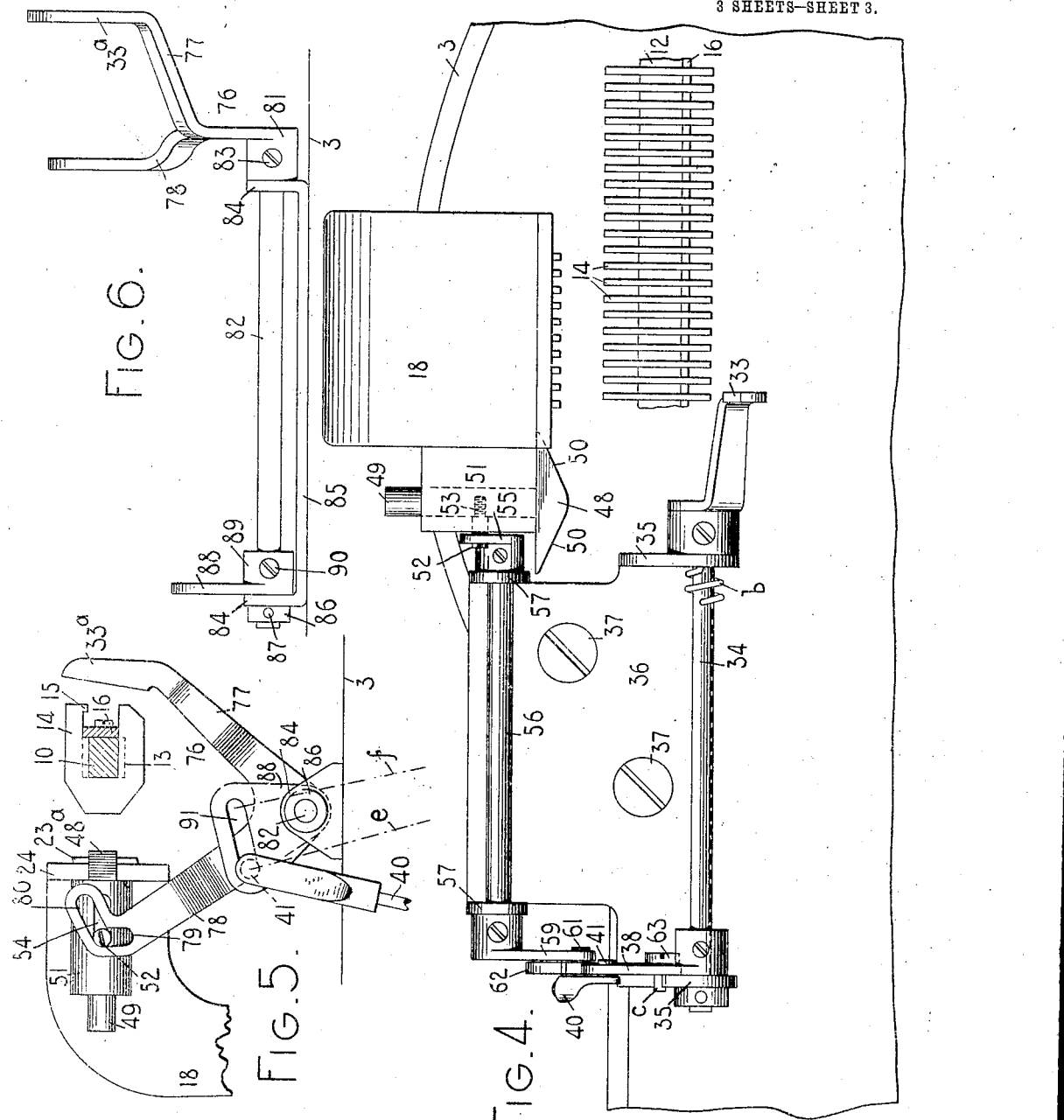

UNITED STATES PATENT OFFICE.

CHARLES H. SHEPARD, OF NEW YORK, N. Y., ASSIGNOR TO UNION TYPEWRITER COMPANY, OF ILION, NEW YORK, A CORPORATION OF NEW YORK.

TYPE-WRITING MACHINE.

974,441.

Specification of Letters Patent. Patented Nov. 1, 1910.

Application filed August 1, 1910. Serial No. 574,903.

*To all whom it may concern:*

Be it known that I, CHARLES H. SHEPARD, citizen of the United States, and resident of the borough of Manhattan, city of New York, in the county of New York and State of New York, have invented certain new and useful Improvements in Type-Writing Machines, of which the following is a specification.

My invention relates to typewriting machines and more particularly to tabulating mechanism.

One object of the present invention, generally stated, is to provide simple and efficient means for quickly selecting the particular column stops intended for use when the character of the work is such as to require change from one set of column stops to another and for projecting the selected column stops to operative position.

A further object of the invention is, generally stated, to provide simple and efficient means for quickly "clearing" the column stops, or for moving them to inoperative position.

To the above and other ends which will hereinafter appear, my invention consists in the various features of construction, combinations of devices and arrangements of parts to be hereinafter described and particularly pointed out in the claims.

In the accompanying drawings wherein like reference characters indicate corresponding parts in the various views, Figure 1 is a fragmentary side elevation, partly in section, of one form of typewriting machine embodying my invention, only so much of the machine being shown as is necessary to an understanding of my invention in its embodiment therein. Fig. 2 is a skeletonized fragmentary side elevation showing a portion of the tabulating mechanism, together with the means for projecting the column stops to operative position and for moving them to the inoperative position. Fig. 3 is a fragmentary side elevation showing some of the parts illustrated in Fig. 2; but showing them on a larger scale. Fig. 4 is a detail fragmentary plan view showing a portion of the tabulator mechanism, together with the means for controlling the column stops in their movements into and out of operative position. Fig. 5 is a fragmentary side elevation showing a modified form of mechanism for controlling the column stops in their movements into and out of operative position. Fig. 6 is a front elevation of some of the parts represented in Fig. 5.

The present invention is in the nature of an improvement on the structures disclosed in the previously filed applications of Sivertsen & Nielsen, Serial No. 488,675; George H. Smith, Serial No. 533,717; George F. Ballou, Serial No. 541,995; Clio B. Yaw, Serial No. 564,227; and Oscar Woodward, Serial No. 565,846, and my invention has some of the same general objects in view as the structures disclosed in said previously filed applications.

I have shown my invention in the present instance embodied in a No. 11 Remington machine but it should be understood that the invention may be embodied in various styles of typewriting machines.

The frame of the machine comprises a base 1, corner posts 2 and a top plate 3. A carriage 4 is mounted on anti-friction balls or rollers 5 to travel from side to side of the machine over the top plate. A cylindrical platen 6 is shown mounted in a conventional manner in the carriage to receive the impact of types 7 against the front face thereof. The front cross bar of the carriage carries a carriage scale 8 with which a fixed pointer 9 coöperates in the usual manner.

Bracket arms 10 are secured by screws 11 to the carriage near the ends thereof and project rearwardly from the carriage and are connected to a column stop bar 12. This column stop bar has teeth 13 formed on the upper and lower sides thereof and bifurcated flat sheet metal tabulator or column stops 14 are received and adapted to slide fore and aft of the machine in the interdental spaces between the teeth 13. Each column stop has a depending projection 15 which constitutes a stop to limit the movement of the column stop toward the rear of the machine. A bar 16 is detachably secured to the column stop bar by screws 17. The upper edge of the bar 16 closes the upper interdental spaces at one end thereof and projects into the path of the projections 15 on the column stop, so as to coöperate therewith to limit the rearward movement of the column stops and prevent an accidental detachment of the column stops from the column stop bar. There is sufficient friction between each column stop and the walls of the set of interdental spaces in which it is received to maintain the column stop in either the operative or inoperative position to which it may be moved. There are preferably as many sets of interdental spaces in the column stop bar as there are letter space positions in the travel of the carriage, or as there are indices on the carriage scale with which the fixed pointer 9 coöperates. There are likewise preferably as many column stops 14 as there are interdental spaces, so that a separate column stop is provided for each letter space position of the carriage.

Any suitable tabulator mechanism may be employed to coöperate with the column stops 14. In the present instance I have shown denominational tabulator mechanism such as is employed in the No. 11 Remington machine. Thus, a tabulator frame 18 is secured to the frame of the machine by screws 19 and 20, so that for the purpose of the present invention the tabulator frame may be regarded as a part of the frame of the machine. Denominational stop levers 21 are pivoted at 22 to the tabulator frame, and extend upwardly and forwardly at the free ends thereof to provide denominational stops 23 which extend through guide slots in a plate 24 secured to the tabulator frame. The lower end of each denominational stop lever is connected to a link 25, which has its forward end connected to a depending arm 26 of an angular actuating lever. The forwardly extending arm 27 of this lever is operatively connected to a key stem 28 guided in openings in guide plates 29 and 30. Each key stem 28 is provided with a tabulator key 31 arranged at the keyboard of the machine. Each angular lever 26—27 has the rear end of a contractile spring 32 connected thereto; the forward end of each of said springs being connected to the guide plate 30. It will be understood that a depression of any of the tabulator keys 31 is effective to move the corresponding denominational stop forward into the path of the column stop or stops which have been moved rearwardly to operative position on the column stop bar. The release of the carriage is, at the same time, effected by the usual carriage release mechanism, not shown.

In order to project the different column stops to proper position I have provided a projector, moving or shifting device 33 which is in the nature of a crank arm, which has an offset contact portion adapted to coöperate with the column stops as they are brought successively into register therewith; the width of the contact portion being such as to coöperate with but one column stop at a time. Upon reference to Fig. 4 it will be observed that this contact portion is arranged in a line fore and aft of the machine just to the right of the left hand or decimal stop of the series of denominational stops 23, and is also arranged forward of the column stop bar so that a rearward movement of the projector is effective to move the column stop, which is in register therewith, rearwardly to operative position. The projector 33 is fixed on one end of a rock shaft 34 mounted to turn in bearing openings in upwardly extending arms 35 of a bracket 36 secured to the top plate of the machine by screws 37. The left-hand end portion of the rock shaft 34 has mounted thereon a crank arm 38 which extends rearwardly from the shaft and has an open-ended slot 39 formed in the free end thereof. An actuating link 40 is provided at its upper end with a laterally projecting pin 41 which is adapted to be received in the slot 39 in the actuating arm 38, as indicated in Fig. 1. The lower end of the link 40 is pivoted at 42 to a key lever 43, fulcrumed at 44 in the base of the machine. The key lever extends forwardly to the keyboard of the machine and preferably to the left of the printing keys $a$ and is provided with a key 45 which is fixed thereto, so that a depression of the key 45 is effective to move the link 40 downwardly, when the parts are in the position represented in Fig. 1, and thus transmit motion to the arm 38. This causes the projector 33 to be moved rearwardly, to project the column stop which is in register therewith to operative position.

When pressure on the finger key is released, a spring 46 connected at one end to the key lever 43 and at its opposite end to a plate 47, is effective to move the key lever and the parts connected therewith to the normal position shown in Fig. 1. In addition to the spring 46, a spring $b$ may be connected at one end to the shaft 34 and at its other end to one of the arms 35 to assure a return movement of the device 33 to normal position, the member 33 being limited in its return movement by suitable stops such as the stops $c$ and $d$, one carried by the arm 38 and the other by one of the bracket arms 35. The projecting device 33 being carried by the frame of the machine and the column stops 14 being carried by the carriage, it follows that the travel of the carriage is effective to produce a relative movement between the column stops and the projecting device 33, so as to bring the column stops successively into register with the contact portion of the device 33, and that the position of the carriage in its travel therefore determines which column stop shall be brought into register with the projector to be moved thereby into operative position. In short, this relative movement between the column stops and the projecting device 33 is effective to select different column stops which are to be projected to operative position for use.

In setting the column stops to operative position, a work sheet may be introduced into the machine and the carriage may be moved to a position where the first column is to be started. The operator may then depress the key 45 to actuate the projector 33, thus moving the column stop which is in register therewith rearwardly into operative position. This point may be at, say, "23" on the carriage scale, and is indicated by the pointer 9 on the carriage scale. The operator may then proceed with the writing and move the carriage to the next position to begin the second column which it may be assumed is at "40" on the carriage scale. A depression of the key 45 is effective to project the column stop at "40" to determine the beginning of the column at this point. The operator may proceed with the writing in the second column and so on. In writing the next and subsequent sheets, where the same set of column stops is to be employed, it is merely necessary to depress the tabulator key which controls the left-hand or decimal stop of the series of denominational stops and the carriage will be successively arrested at the different positions "23," "40," etc., where the column stops were selected in the first instance. It will be understood, therefore, that the selection of the column stops may be readily effected during the writing of the first sheet.

In order to reset, "clear" or restore the different column stops to inoperative position, I have provided a shifting, moving, clearing device, cam or wiper 48 provided with a cylindrical stem 49. This cam has oppositely inclined faces 50, as will be seen upon reference to Fig. 4, so as to coöperate with the column stops during the movement of the carriage in either direction. The cylindrical stem is received in a corresponding bearing opening bored through a projection 51 which may be cast or formed integral with the tabulator frame 18. A pin 52 is threaded at one end, as indicated at 53 in Fig. 4, for the reception in a tapped opening in the stem 49 of the cam, in order that the pin may be detachably secured to the stem. This pin 52 projects through a slot 54 which is formed in the projection 51 and extends fore and aft of the machine. The pin and slot thus guide the cam in its movement and also limit the forward movement of the cam. By detaching the pin 52 from the stem 49 the stem may be removed from the bearing by which it is supported. An actuating arm 55 extends upwardly from a rock shaft 56, supported in bearing openings in upwardly projecting ears 57 formed on the bracket 36. The upper end portion of the actuating arm is provided with a slot 58 to receive the pin 52, to operatively connect the cam 48 with the actuating arm 55. The opposite end of the rock shaft 56, from that which carries the arm 55, is provided with a crank arm 59 which extends forwardly from the rock shaft. The arm 59 is slotted longitudinally at 60 to receive a laterally projecting pin 61 which projects from a lever 62, pivoted at 63 to one of the upwardly extending bracket arms 35. The free end portion of the lever 62 is slotted at 64, the open mouth of the slot extending toward and forming practically a continuation of the slot 39 when the parts are in the normal position. The two slots 39 and 64 in the normal position of the parts are in register and practically form an arc, of which the pivot point 42, around which the link 40 is adapted to turn, is the center. It will be understood therefore that when the link 40 swings around its pivot 42 from the position shown in Fig. 1 to that represented in Fig. 2 or vice versa, an operative connection is effected between said link and one of the members 38 or 62 and a disconnection between said link and the other of said members is effected.

The means by which the link 40 is switched or shifted, to operatively connect it with either of the members 38 and 62, and to the projecting device 33 or the restoring device 48, as illustrated in Figs. 1 and 2, in the present instance, comprises a link 65 pivoted at 66 to the link 40, and extending forwardly therefrom through a guide opening in a bracket 67 secured at 68 to the lever 43. The forward end of the link 65 is pivoted at 69 to an angular lever 70 pivoted at 71 to the key stem of the key 45. Stop pins 72 and 73 project laterally from the key lever 43 and limit the movement of the angular lever 70 relatively to the key lever 43. A forwardly extending arm on the angular lever 70 has an upwardly extending key stem provided with a finger key 74; said finger key being offset from the pivot 71 so that a depression on said key is effective to turn the angular lever on its pivot 71 until the depending arm of the angular lever contacts with the stop pin 73. A coiled expansion spring 75 surrounds the link 65 and bears at one end against the angular lever and at its opposite end against the bracket 67. The pressure of this spring is exerted to normally maintain the depending arm of the angular lever against the stop pin 72, as represented in Fig. 1. This effects a forward movement of the link 40 to bring about the engagement between said link and the crank arm 38, so that the key controlled member or lever 43 is normally operatively connected with the projecting device 33. A depression of the finger key 45 at this time is effective to actuate the projecting device 33 to move the column stop 14, which is in register therewith, to operative position. When, however, pressure is exerted on the finger key 74, as represented in Fig. 2, the angular lever 70 is first turned on its pivot 71 against the pressure of the spring 75. This results in swinging the link 40 rearwardly around its pivot 42 to effect an engagement between said link and the actuating lever 62, and this engagement will be maintained as long as pressure is maintained on the finger key 74. A continued downward pressure on the key 74 moves the key lever 43 downwardly after the engagement between the link 40 and the actuating member 62 has been effected, thus turning the actuating member 62 on its pivot and transmitting movement through the pin and slot connection 61—60 to the crank arm 59, thereby turning the shaft 56, and effecting a forward movement of the arm 55. This is effective to produce a corresponding forward movement of the cam or wiper 48, to bring it into coöperative relation with the column stop, or column stops, which may have been moved rearwardly to operative position on the column stop bar. If at this time the carriage is moved in either direction the member 48 is effective to cam the column stops forward successively to inoperative position, in order to clear the column stops so that a new and different set of stops may be moved to operative position by the projecting device 33.

In the construction shown in Figs. 1–4 inclusive, the members 33 and 48 are separate and independently operable members and the actuation of one may be effected independently of the other.

In Figs. 5 and 6 I have shown a modified form of construction in which the two members or devices 33$^a$ and 48$^a$ are united by a single member and both are moved at each depression of a key 45 or 74, such as the keys shown in Figs. 1 and 2, although only one of said devices 33$^a$ and 48$^a$ is effective at a time. This member comprises a bifurcated part designated as a whole by the reference numeral 76, bent to form separate offset arms 77 and 78. The arm 77 carries the projecting device 33$^a$ which is adapted to coöperate with the column stops in the same manner as the devices 33, to move them individually to operative position on the column stop bar 12. The rearwardly projecting arm 78 is provided with an upright slot 79 which joins an inclined slot 80, the slot 79—80 receiving the pin 52 to connect the arm 78 with the stem 49 of the restoring cam 48$^a$. The member 76 has a hub 81 secured to one end of a rock shaft 82 by a set screw 83. The rock shaft 82 turns in bearing openings in upright ears 84 formed on a bracket plate 85 secured to the top plate of the machine. The hub of the member 76 bears against one of the ears 84 to prevent a longitudinal movement of the shaft 82 in one direction. A collar 86 is secured to the opposite end of the shaft by a pin 87, and bears against the other ear 84 and prevents a longitudinal movement of the shaft in the opposite direction. A plate-like member 88 is provided with a hub 89, secured by a set screw 90 to the rock shaft 82, near the end thereof opposite that which carries the member 76. This plate-like member 88 is in the nature of a crank arm and is slotted at 91 for the reception of the pin 41 on the actuating link 40. The length of the slot is such as to permit a swinging movement of the link 40 around its pivot to either side of the axis of the rock shaft 82, or from one effective position indicated by the dotted line $e$ in Fig. 5 to the other effective position indicated by the dotted line $f$ in said figure, or vice versa. The control of the link 40 is preferably effected by finger keys 45 and 74, and the parts controlled by said keys coöperate with the link in the same manner as in the construction disclosed in Figs. 1 to 4 inclusive. It will be understood, therefore, that the spring 75 normally maintains the pin 41 in the forward end of the slot 91, so that a depression of the finger key 45 is effective to depress the link 40, the line of force of which is along the line $f$, thus rocking the shaft 82, thereby turning the arm 78 forwardly, and producing a corresponding forward movement of the cam 48$^a$ to operative position. A depression of the finger key 74 is effective to swing the link 40 rearwardly, as in the previously described construction, but in this instance the pin 41 is moved to the rear end of the slot 91 so that the line of force is directed along the line $e$ so as to turn the rock shaft 82 in a direction to effect a rearward movement of the projector 33$^a$, thereby moving the column stop 14 which is in register with said projector, to operative position. It will be understood that when pressure is first exerted upon the finger key 74 it is effective to swing the link so as to bring the pin 41 to the rear end of the slot 91. When the depending arm of the angular lever 70 reaches contact with the stop pin 73, the angular lever and key lever move down together as one part, pulling down on the link, thus transmitting a rearward movement to the member 88, which is effective to actuate the projector 33$^a$.

From the foregoing description it will be understood that the member 48 or 48$^a$ each constitutes a device for moving the column stops on the column stop bar in one direction and out of operative position; that the member 33 or 33$^a$ each constitutes a device for moving the column stops in an opposite direction or into operative position; that keys are provided at the keyboard of the machine for actuating either of said devices at will; that switching means are provided for operatively connecting the key controlled member 43 to either of said devices; that the construction is such as to afford a control of either of the said devices from the keyboard of the machine, which affords easy access to the parts and ready operation thereof; and that the mechanism is simple in construction and efficient in use. It will be understood of course that the keys 45 and 74 may be suitably inscribed to indicate their purpose to the operator and to avoid confusion. Thus, one of the keys may be inscribed "stop set" and the other "stop restore."

Various changes may be made without departing from the spirit of my invention and some of the devices may be employed without others.

What I claim as new and desire to secure by Letters Patent, is:—

1. In a typewriting machine and tabulating mechanism, the combination of a series of tabulator stops movable into and out of operative position and adapted to remain in either of said positions to which they are moved; means for moving said stops to operative position; means for moving said stops to inoperative position; and key controlled means controlled from the keyboard of the machine for controlling both of said means.

2. In a typewriting machine and tabulating mechanism, the combination of a series of tabulator stops movable into and out of operative position and adapted to remain in either of said positions to which they are moved; means for moving said stops to operative position; means for moving said stops to inoperative position; a key at the keyboard for controlling one of said means; and a separate key at the keyboard for controlling the other of said means.

3. In a typewriting machine and tabulating mechanism, the combination of a series of tabulator stops movable into and out of operative position and adapted to remain in either of said positions to which they are moved; means for moving said stops to operative position; means for moving said stops to inoperative position; and a single set of key controlled means for controlling either one or the other of the said moving means at will.

4. In a typewriting machine and tabulating mechanism, the combination of a series of tabulator stops movable into and out of operative position and adapted to remain in either of said positions to which they are moved; and means for moving the stops to inoperative position, said means being controlled by a key at the keyboard of the machine.

5. In a typewriting machine and tabulating mechanism, the combination of a series of tabulator stops movable into and out of operative position and adapted to remain in either of said positions to which they are moved; a wiper movable into and out of coöperative relation with said column stops and operative to move the column stops to inoperative position; and a key at the keyboard of the machine for controlling the movement of the wiper into and out of coöperative relation with said column stops.

6. In a typewriting machine and tabulating mechanism, the combination of a plurality of column stops movable into and out of operative position and adapted to remain in either of the positions to which they may be moved; and key controlled means controlled from the keyboard of the machine for controlling said stops in their movements from either one of said positions to the other.

7. In a typewriting machine and tabulating mechanism, the combination of a series of column stops mounted for movement into and out of operative position and adapted to remain indefinitely in either of the said positions to which they may be moved; a device for moving said stops to operative position; a device for moving said stops to inoperative position; a key controlled device; and means for rendering said key controlled device operative on either of said first mentioned devices.

8. In a typewriting machine and tabulating mechanism, the combination of a series of column stops mounted for movement into and out of operative position and adapted to remain indefinitely in either of the said positions to which they may be moved; means for moving said stops to and from operative position; and means operative at will to render said moving means operative to move the stops either to or from operative position.

9. In a typewriting machine and tabulating mechanism, the combination of a series of column stops mounted for movement into and out of operative position and adapted to remain indefinitely in either of the said positions to which they may be moved; a device for moving the stops to operative position; a device for moving the stops to inoperative position; a key controlled member; and means for operatively connecting said key controlled member to either of said moving devices.

10. In a typewriting machine and tabulating mechanism, the combination of a series of column stops mounted for movement into and out of operative position and adapted to remain indefinitely in either of the said positions to which they may be moved; a wiper for moving said stops to inoperative position; a key at the keyboard of the machine; and intermediate connections between said key and wiper for moving the latter into coöperative relation with said column stops.

11. In a typewriting machine and tabulating mechanism, the combination of a carriage; a frame of the machine; a series of column stops carried by one of said parts; a wiper carried by the other of said parts whereby a relative movement between the column stops and wiper may be effected by a movement of the carriage and which relative movement is effective to wipe or cam the said stops to inoperative position; a key at the keyboard of the machine; and operative connections between said key and wiper and by which the key is effective to move the wiper into coöperative relation with said column stops.

12. In a typewriting machine and tabulating mechanism, the combination of a carriage; a frame of the machine; a series of column stops carried by one of said parts and movable into and out of operative position and adapted to remain indefinitely in either of the said positions; a wiper carried by the other of said parts whereby a relative movement between the column stops and wiper may be effected by a movement of the carriage and which relative movement is effective to wipe or cam the said stops to inoperative position; means carried by the same part which carries the wiper for projecting said stops individually to operative position; and key operated means controlled from the keyboard of the machine for projecting said wiper to operative position or for actuating said projecting means as may be desired.

13. In a typewriting machine and tabulating mechanism, the combination of a carriage; a frame of the machine; a series of column stops carried by one of said parts and movable into and out of operative position and adapted to remain indefinitely in either of the said positions; a wiper carried by the other of said parts whereby a relative movement between the column stops and wiper may be effected by a movement of the carriage and which relative movement is effective to wipe or cam the said stops to inoperative position; means carried by the same part which carries the wiper for projecting said stops individually to operative position; a key at the keyboard of the machine for moving said wiper into coöperative relation with said column stops; and a separate key at the keyboard of the machine for controlling the actuation of said projecting means.

14. In a typewriting machine and tabulating mechanism, the combination of a carriage; a frame of the machine; a series of column stops carried by one of said parts and movable into and out of operative position and adapted to remain indefinitely in either of the said positions; a wiper carried by the other of said parts whereby a relative movement between the column stops and wiper may be effected by a movement of the carriage and which relative movement is effective to wipe or cam the said stops to inoperative position; means carried by the same part which carries the wiper for projecting said stops individually to operative position; a key controlled device, and switching means for operatively connecting said key controlled device with either the wiper or with said stop projecting means as may be desired.

15. In a typewriting machine and tabulating mechanism, the combination of a carriage; a frame of the machine; a series of column stops carried by the carriage and movable into and out of operative position and adapted to remain indefinitely in either of said positions; a device carried by the frame of the machine for moving the stops individually to operative position; a device carried by the frame of the machine for moving said stops to inoperative position; and key controlled means controlled from the keyboard of the machine for controlling both of said devices.

16. In a typewriting machine and tabulating mechanism, the combination of a carriage; a frame of the machine; a series of column stops carried by the carriage and movable into and out of operative position and adapted to remain indefinitely in either of said positions; a device carried by the frame of the machine for moving the stops individually to operative position; a device carried by the frame of the machine for moving said stops to inoperative position; and a separate key at the keyboard for each of said devices, one key controlling the actuation of one of said devices and the other key controlling the actuation of the other of said devices.

17. In a typewriting machine and tabulating mechanism, the combination of a carriage; a frame of the machine; a series of column stops carried by the carriage and movable into and out of operative position and adapted to remain indefinitely in either of said positions; a device carried by the frame of the machine for moving the stops individually to operative position; a device carried by the frame of the machine for moving said stops to inoperative position; a key controlled member; and means for operatively connecting said key controlled member with one or the other of said devices.

18. In a typewriting machine and tabulating mechanism, the combination of a carriage; a frame of the machine; a series of column stops carried by the carriage and movable into and out of operative position and adapted to remain indefinitely in either of said positions; a device carried by the frame of the machine for moving the stops individually to operative position; a device carried by the frame of the machine for moving said stops to inoperative position; a key lever; a link operatively connected to said key lever; and means for operatively connecting said link with one or the other of said devices.

19. In a typewriting machine and tabulating mechanism, the combination of column stops movable into and out of operative position and adapted to remain indefinitely in either of said positions to which they may be moved: a key controlled device for moving the stops to operative position; a key controlled device for moving said stops out of operative position; and means for rendering one of said devices inoperative when the other is operative.

20. In a typewriting machine and tabulating mechanism, the combination of column stops movable into and out of operative position and adapted to remain indefinitely in either of said positions to which they may be moved, a key controlled device for moving the stops to operative position; a key controlled device for moving said stops out of operative position; and means for disconnecting one of said devices from its key when the other of said devices is connected to its key.

21. In a typewriting machine and tabulating mechanism, the combination of column stops movable into and out of operative position and adapted to remain indefinitely in either of said positions to which they may be moved: a key controlled device for moving the stops to operative position; a key controlled device for moving said stops out of operative position; a link; and means for disconnecting said link from one of said devices and for connecting it with the other of said devices.

22. In a typewriting machine and tabulating mechanism, the combination of column stops movable into and out of operative position and adapted to remain indefinitely in either of said positions to which they may be moved; a key operated member; a device for moving said stops to operative position; a device for moving said stops out of operative position; and means for disconnecting said key operated member from one of said devices and for operatively connecting it with the other of said devices.

23. In a typewriting machine and tabulating mechanism, the combination of column stops movable into and out of operative position and adapted to remain indefinitely in either of said positions to which they may be moved; a key operated member; a device for moving said stops to operative position; a device for moving said stops out of operative position; a link operatively connected to said key operated member; and hand controlled means operable at will for disconnecting said link from one of said devices and for operatively connecting the link with the other of said devices.

24. In a typewriting machine and tabulating mechanism, the combination of a series of tabulator stops mounted for movement into and out of operative position and adapted to remain indefinitely in either of the said positions to which they may be moved; a device for moving said stops to one of said positions, said device having a cylindrical stem; a tabulator frame having a supporting portion formed integral therewith, said supporting portion being bored to form a cylindrical bearing opening for said stem and slotted in the direction of the length of the stem; and a pin which passes into said slot and which is detachably connected to said stem, the pin and slot guiding the stem and said device of which it forms part in their movement, and a detachment of the pin enabling the said device and its stem to be dismounted.

Signed at the borough of Manhattan, city of New York, in the county of New York, and State of New York, this 29th day of July, A. D. 1910.

CHARLES H. SHEPARD.

Witnesses:
CHARLES E. SMITH,
E. M. WELLS.